(12) United States Patent
Alhseinat et al.

(10) Patent No.: US 11,318,419 B2
(45) Date of Patent: May 3, 2022

(54) MECHANICAL PRESSURE CONVERTER FOR WATER DESALINATION

(71) Applicant: Khalifa University of Science and Technology, Abu Dhabi (AE)

(72) Inventors: Emad Alhseinat, Abu Dhabi (AE); Rawdha Alhammadi, Abu Dhabi (AE); Ohoud Alyammahi, Abu Dhabi (AE); Shatha AlMarri, Abu Dhabi (AE); Bashar El-Khasawneh, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 304 days.

(21) Appl. No.: 16/681,157

(22) Filed: Nov. 12, 2019

(65) Prior Publication Data
US 2020/0376435 A1 Dec. 3, 2020

Related U.S. Application Data

(60) Provisional application No. 62/853,456, filed on May 28, 2019.

(51) Int. Cl.
*B01D 61/10* (2006.01)
*C02F 1/44* (2006.01)
(Continued)

(52) U.S. Cl.
CPC ............ *B01D 61/10* (2013.01); *B01D 61/025* (2013.01); *B01D 61/08* (2013.01); *C02F 1/441* (2013.01);
(Continued)

(58) Field of Classification Search
CPC ...... B01D 61/10; B01D 61/025; B01D 61/08; B01D 2313/243; B01D 2313/36; C02F 1/441; C02F 2103/08; C02F 2201/009; F03D 9/28; F03D 1/04; Y02A 20/131; Y02A 20/141; Y02A 20/212; F05B 2220/62; Y02E 10/72
See application file for complete search history.

(56) References Cited

U.S. PATENT DOCUMENTS

| 6,641,371 B2 * | 11/2003 | Graziani | F04B 49/16 |
| | | | 417/274 |
| 2015/0298062 A1 * | 10/2015 | Zhu | B01D 61/12 |
| | | | 210/103 |

FOREIGN PATENT DOCUMENTS

JP 2008118849 A * 5/2008

* cited by examiner

*Primary Examiner* — Waqaas Ali
(74) *Attorney, Agent, or Firm* — Hayes Soloway P.C.

(57) ABSTRACT

The present invention discloses a pressure converter system for sustainably forcing saline water through a semi-permeable membrane, comprising a hydraulic oil pump, a hydraulic oil cylinder comprising pressurized oil generated from the hydraulic oil pump, a sustainable energy source for powering the hydraulic oil pump, a saline water cylinder containing saline water, wherein the hydraulic oil cylinder and the saline water cylinder are connected using a piston and an electrical circuit for determining a direction of movement of the piston. This system may be developed to a stand-alone desalination facility comprising a ducted windmill that can harvest energy from a wide range of wind speeds, especially very low wind speeds. Because of the above, the present invention successfully converts mechanical energy to high pressure that is required to produce fresh water from saline water.

19 Claims, 9 Drawing Sheets

(51) Int. Cl.
*B01D 61/02* (2006.01)
*F03D 9/28* (2016.01)
*B01D 61/08* (2006.01)
*C02F 103/08* (2006.01)

(52) U.S. Cl.
CPC .......... *F03D 9/28* (2016.05); *B01D 2313/243* (2013.01); *C02F 2103/08* (2013.01); *C02F 2201/009* (2013.01)

MECHANICAL PRESSURE CONVERTER FOR WATER DESALINATION

CROSS REFERENCE TO RELATED APPLICATION

This application claims benefit of U.S. Provisional Application Ser. No. 62/853,456, entitled, "Mechanical Pressure Converter for Water Desalination" filed May 28, 2019, the entire disclosure of which is incorporated herein by reference.

FIELD OF THE INVENTION

The present invention relates to a water desalination system and more particularly a hydraulic system that converts mechanical energy into a pressure required for producing fresh water through membrane desalination.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Saline water contains significant amounts of dissolved salts, and the vast majority of water on the Earth's surface is saline water in the oceans. The freshwater resources, such as water falling from the skies and moving into streams, rivers, lakes, and groundwater, provide people with the water they need every day to live. The total volume of water on Earth is estimated to be 1.386 billion $km^3$ with approximately 97% of the same being salt water (saline) and 3% being fresh water. Plant and animal species are adapted to live in either one type of water or the other, but very few can thrive in both.

Ocean water has an average salinity of 3.5% with 35 grams of salt dissolved in every litre of seawater. Salt (or sodium chloride, NaCl) is an electrolyte, which when dissolved in water becomes ions with positive and negative electrical charges, comprising sodium ions ($Na^+$) and chlorine ions ($Cl^-$). Conductivity is a measure of water's capability to pass the flow of electricity and this ability is directly related to the concentration of ions in the water. Additionally, the more ions that are present, higher will be the conductivity of water. Likewise, the fewer ions that are in the water, the less conductive it will be. Distilled or deionized water can act as an insulator due to its very low, if not negligible conductivity value. Seawater on the other hand, has a very high conductivity.

As a result, saltwater is denser than freshwater due to the dissolved sodium chloride (NaCl) within it. This means that a specific volume of salt water is heavier than the same volume of freshwater. The salinity lends itself to the other differences between ocean and freshwater and poses a challenge for the organisms that thrive in saltwater. It is believed that the salt in ocean water comes from salt leaching out of the ocean floor as well as salt that is carried out of rivers and streams. For these reasons, high levels of sodium chloride (NaCl) in salt water prevent it from being classified as fresh water, and this high density of salt is detrimental to human health.

The scarcity of fresh water resources and the need for additional water supplies is already critical in many arid regions of the world and will be increasingly important in the future. Many arid areas do not have fresh water resources in the form of surface water such as rivers and lakes. They may have only limited underground water resources, some that are becoming more brackish as extraction of water from the aquifers continues. For this reason, efforts have contributed towards converting saltwater to potable water. Desalination is a popular treatment solution throughout the world today and these technological processes are performed on a large scale in order to be useful to large populations. However, these currently used processes are expensive, energy-intensive, and involve large-scale facilities.

Three different desalination methods are traditionally used, comprising thermal, electrical, and pressure techniques. Firstly, thermal desalination method is the oldest and involves boiling water, collecting the steam and leaving the salt behind. However, the vaporization phase change requires significant amounts of energy. Secondly, a more recent method utilises electric current to separate the salt from the water. The electric current is used to drive ions across a selectively permeable membrane, carrying the dissociated salt ions with it. A key characteristic of this method is that the energy requirement depends on how much salt is initially present in the water. Consequently, it is suitable for water with initial salt concentrations but too energy intensive for seawater. Thirdly, a commonly used method of desalination, is reverse osmosis, in which pressure is used to drive water through a selectively permeable membrane, leaving the salt behind. Desalination using reverse osmosis (RO) is the leading pressure driven membrane process, which functions to remove specific materials, such as salts and ions from the saline water.

Membranes are very efficient and energy friendly for water purification applications. They function to remove specific material, for example, total dissolved solids (TDS) in form of mono and divalent ions such as sodium chloride (NaCl), Magnesium sulphate ($MgSO_4$), calcium sulphate ($CaSO_4$) or other high molecular weight materials such as sugars, chemicals, organic molecules and other macromolecules. As a result, the reverse Osmosis®O membrane is optimized to reject $Na^+Cl^-$ ions for effective desalination. Membrane desalination and water treatment processes have developed very quickly, and most new facilities employ reverse osmosis technology.

The reverse osmosis (RO) process uses semi-permeable membranes and pressure to separate salts and other impurities from water. The membranes used for reverse osmosis (RO) have a polymer matrix with a dense barrier layer wherein most of the separation occurs. This process is capable of treating water with varying salt and impurity concentrations over a wide range of 50 to 50,000 parts per million (ppm, also referred as milligrams per litre) of total dissolved solids (TDS). RO plants consume about 30 Watt-hours of electricity per gallon of (seawater) water desalinated or less depending on the salt content concentration. In most cases, the membrane is designed to allow only water to pass through this dense layer, while preventing the passage of solutes such as salt ions.

These membranes are further capable of removing up to 99.5% of salts, particulates, dissolved organics and emulsified oil. However, the process requires that a high pressure be exerted on the feed side of the membrane, usually 50 to 300 psi for surface and brackish water, and 500 to 1000 psi for seawater, in order to overcome the osmotic pressure corresponding to salt concentrations. RO membrane systems typically use less energy than other desalination techniques such as thermal distillation, ion exchange and electro-dialysis—and have led to an overall reduction in desalination costs over the past decade. Out of the more than 7500 desalination plants in operation worldwide, 60% are located in the Middle East. The world's largest plant in Saudi Arabia produces 128 million gallons per day (MGD) of desalted water. In contrast, 12% of the world's capacity is produced in the United States of America, with most of the plants located in the Caribbean and Florida. The most important users of desalinated water are in the Middle East (mainly Saudi Arabia, Kuwait, United Arab Emirates, Qatar and Bahrain), which uses about 70% of the worldwide capacity, and in North Africa (mainly Libya and Algeria), which uses about 6% of worldwide capacity.

Previously, attempts were made to use wind energy as a clean and sustainable energy source for membrane desalination, wherein the wind energy produced electricity using huge turbines to power the pumps in the membrane desalination plant. However, the efficiency of wind turbine is low and it requires high wind speed to reach acceptable electricity production limits.

As a result of the above, continued efforts to reduce the cost of desalination have driven a large number of technological advances. Therefore, there is yet a growing need to develop systems that can contribute to the global demand of water. Although desalination processes have been used globally, further efforts are required to design systems that offer a sustainable solution. Accordingly, there exists a need to develop a system, which sustainably desalinates water without consuming large amounts of energy.

SUMMARY OF THE INVENTION

Therefore it is an object of the present invention to provide a system which sustainably desalinates water without consuming large amounts of energy.

The present invention involves a pressure converter system for sustainably forcing saline water through a semi-permeable membrane, the pressure converter system comprising a hydraulic oil pump, a hydraulic oil cylinder comprising pressurized oil generated from the hydraulic oil pump, a sustainable energy source for powering the hydraulic oil pump, a saline water cylinder containing saline water, wherein the hydraulic oil cylinder and the saline water cylinder are connected using a piston and an electrical circuit for determining a direction of movement of the piston.

In an embodiment of the present invention, the electrical circuit comprises a first limit switch, a second limit switch and a solenoid valve, wherein the solenoid valve is triggered to switch a direction of movement of the piston, when the piston comes in contact with the first or second limit switch.

In another embodiment of the present invention, the first and second limit switches are positioned at a first end of the hydraulic oil cylinder and a second end of the saline water cylinder.

In another embodiment of the present invention, the electrical circuit further comprises a voltage regulator, an RS flip-flop and a relay.

In another embodiment of the present invention, the voltage regulator controls a power provided to the first and second limit switches ensuring that the first and second limit switches do not overheat.

In another embodiment of the present invention, pressure from the pressurized oil is transmitted to the saline water contained within the saline water cylinder, resulting in pressurized saline water.

In another embodiment of the present invention, the system is used for transforming saline water into fresh water sustainably.

In another embodiment of the present invention, the sustainable energy source is a ducted windmill.

In another embodiment of the present invention, the system further comprises a plurality of relief valves to control an increase or decrease in pressure within the hydraulic oil cylinder and the saline water cylinder. In another embodiment of the present invention, the hydraulic oil cylinder is a double acting cylinder.

In another embodiment of the present invention, the solenoid valve is a four-way valve.

In another embodiment of the present invention, the saline water cylinder is made of stainless steel for resisting salinity of the saline water being stored.

In another embodiment of the present invention, a plurality of hydraulic O-rings are positioned within the hydraulic oil cylinder and saline water cylinder.

In another embodiment of the present invention, a plurality of hydraulic seals are positioned within the saline water cylinder to separate fluids from the hydraulic oil cylinder and saline water cylinder.

In another embodiment of the present invention, the saline water cylinder is connected with a saline water reservoir.

In another embodiment of the present invention, the piston is extendable and retractable.

As another aspect of the present invention, a method of sustainably pressurizing seawater for penetrating through a semi-permeable membrane for desalination, the method comprising the steps of retracting a piston from a first position to a second position owing to which oil flows through a hydraulic oil cylinder, wherein retraction of the piston creates a suction force within a seawater cylinder, thereby filling the seawater cylinder with seawater, switching a direction of movement of the piston when the piston comes in contact with a limit switch, pushing the seawater contained within the seawater cylinder towards the semi-permeable membrane, wherein the seawater being pushed out of the seawater cylinder is pressurized and capable of penetrating through the semi-permeable membrane.

In another embodiment of the present invention, a solenoid valve is used for switching the direction of movement of the piston when in contact with the limit switch.

In another embodiment of the present invention, the solenoid valve is a four-way valve.

In another embodiment of the present invention, movement of the piston is automatic.

In another embodiment of the present invention, the piston is extendable and retractable.

In another embodiment of the present invention, the method is used for transforming seawater into fresh water sustainably.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of the device or system for sustainable desalination of seawater according to the present invention will be described in conjunction with FIGS. 1-8. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

The proposed solution aims at developing a sustainable mechanical pressure converter for water desalination, which transforms salt water into fresh water without the use of electricity. The ultimate goal is to develop a hydraulic system that converts mechanical energy, such as wind or wave energy into the pressure needed to produce fresh water through membrane desalination. More specifically, the present invention resolves the issue of consuming large amounts of energy using centrifugal pumps, which are commonly used to generate the high pressure.

Water desalination facilities provide 80 percent of the water consumed in the UAE region. The current seawater desalination process are expensive and require large amounts of power. For these reasons, this invention provides an innovative, sustainable solution to the problem of converting seawater to potable water using a mechanical pressure converter coupled with a membrane water desalination system. The present invention eliminates the need for electricity or fossil fuels by using a hydraulic system that converts mechanical energy i.e. wind energy into the pressure needed to produce fresh water. The present invention illustrates the design and fabrication of mechanical pressure converter and full desalination system. The mechanical pressure converter is used to convert the mechanical energy that can be extracted from natural resources such as wind or wave directly to pressure that is used to desalinate water through reverse osmosis membrane.

In accordance with the present invention, the presented system was fabricated and tested and successfully converts mechanical energy to high pressure to produce fresh water from saline water. Reverse osmosis (RO) is a mature technology that is widely used for produce fresh water from saline water i.e. seawater and brackish water. In reverse osmosis (RO), salts are separated from water through the use of a semi-permeable membrane, wherein high pressure is required to pass the water through the membrane. Traditionally, this pressure was generated using centrifugal pumps, which consumes massive amounts of energy to function. The present invention overcomes this problem by using the power of mechanical energy to generate electricity. This has been achieved through developing a hydraulic system.

Figure 1:
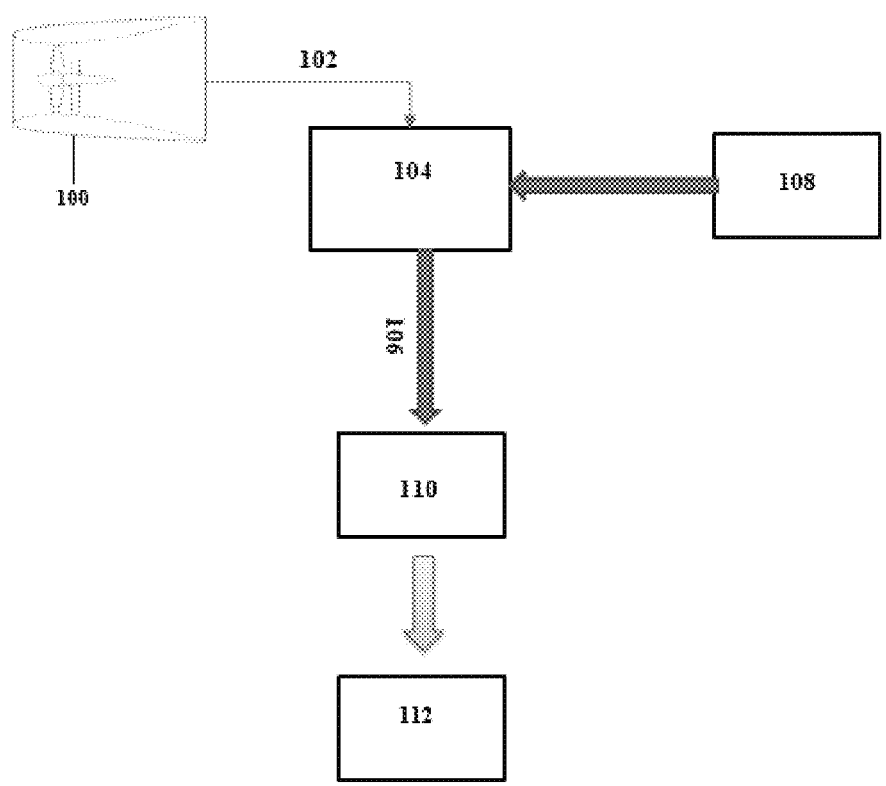
FIG. 1 illustrates the basic configuration of the desalination process, in accordance with the present invention.

In the present invention, mechanical energy is utilized, which overcomes issues faced by traditional systems. The present design is targeted to achieve higher efficiency and lower energy consumption. FIG. 1 shows a basic configuration of the process in accordance with the present invention. As depicted in FIG. 1, a ducted windmill 100 is used to produce wind mechanical energy (shown as 102). This mechanical energy 102 along with low pressure seawater 108 enters a hydraulic pressure converter 104 which converts the low pressure seawater 108 into high pressure seawater 106. This high pressure seawater 106 then possesses the force required to permeate through a reverse osmosis (RO) membrane 110, thereby resulting in the production of fresh water 112.

In an embodiment of the present invention, a mechanical pressure converter is proposed for transforming salt water into fresh water without the use of electricity. This mechanical pressure converter is coupled with a membrane water desalination system and eliminates the need for electricity or fossil fuels.

Figure 2:
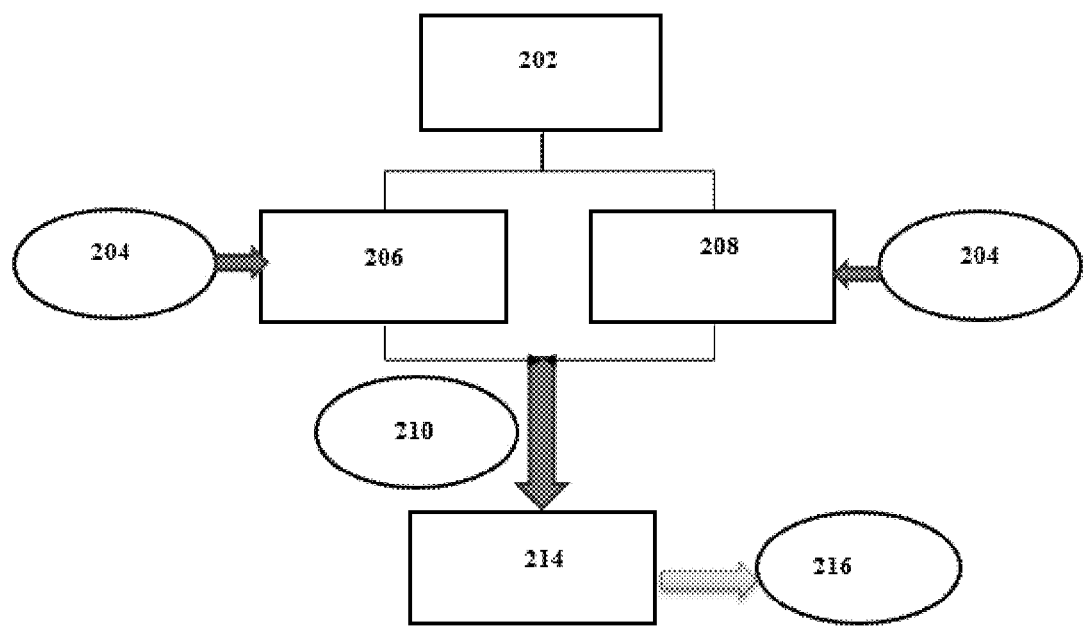
FIG. 2 displays the overall system, in which mechanical energy is converted to pressure to produce freshwater from saltwater.

In accordance with another embodiment of the present invention, the proposed system is a stand-alone desalination facility. The RO desalination unit is designed such that the required pressure for desalination will be obtained through the hydraulic system in accordance with the present invention, or by using electric power. In this case, both power sources are produced from the ducted windmill 100 and a switch between the mechanical and electrical power sources depend on the wind speed. FIG. 2 denotes a complete desalination facility, which comprises a ducted windmill 202 to which wind is input, a hydraulic power unit 206 and an electrical power unit 208. The system functions by incorporating both the hydraulic power unit 206 and the electrical power unit 208 within the desalination facility, both of which are power sources produced from the ducted windmill 202, in order to generate the required pressure according to the current wind speed and through maintaining an efficiency of the RO desalination unit 214. As illustrated in FIG. 2, both power sources are shown to effectively convert low-pressure seawater 204 to high-pressure seawater 210, which then passes through the RO desalination unit 214 to efficiently generate fresh water 216.

In accordance with another embodiment of the present invention, the desalination system comprising the ducted windmill 202, the hydraulic power unit 206 and the RO desalination unit 214, is able to operate without grid access and is further compatible with a wide range of wind speeds, including very slow winds. The windmill 202 is equipped with a flow augment duct and is capable of harvesting energy using very slow wind speeds (approximately 2.5~3 m/s), thereby enabling the system to be usable, or to function sustainably on almost any location on the earth. In addition, these features make the desalination system effective and sustainable.

In another embodiment, the system in accordance with the present invention may supply clean water to any location on the earth. Furthermore, owing to the proposed design, the system enables users to transport, assemble, maintain and upgrade the facility with ease. The design also comprises expansion ports that are reserved for additional energy access, including wind, solar, fuel, grid, or even manpower access for extremely urgent situations.

Figure 3:
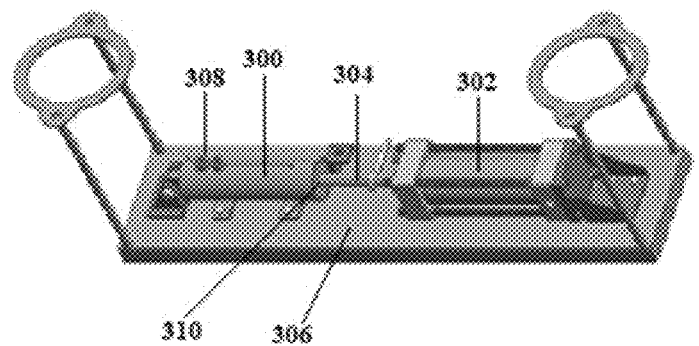
FIG. 3(a) depicts an isometric view of the mechanical pressure converter design comprising of a first saltwater cylinder and a second hydraulic cylinder, in accordance with the present invention.
FIG. 3(b) depicts an isometric view of the mechanical pressure converter design, comprising of a first saltwater cylinder and a second hydraulic cylinder, in accordance with the present invention.
FIG. 3(c) depicts a side view of the mechanical pressure converter design, comprising of a first saltwater cylinder and a second hydraulic cylinder, in accordance with the present invention.
Figure 3:
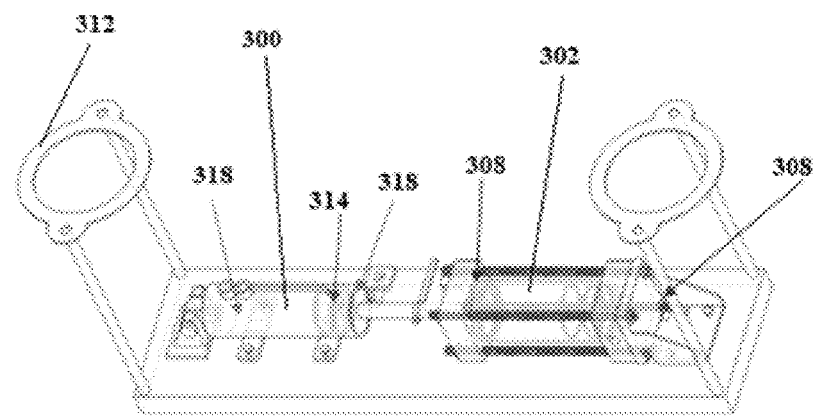
Figure 3:
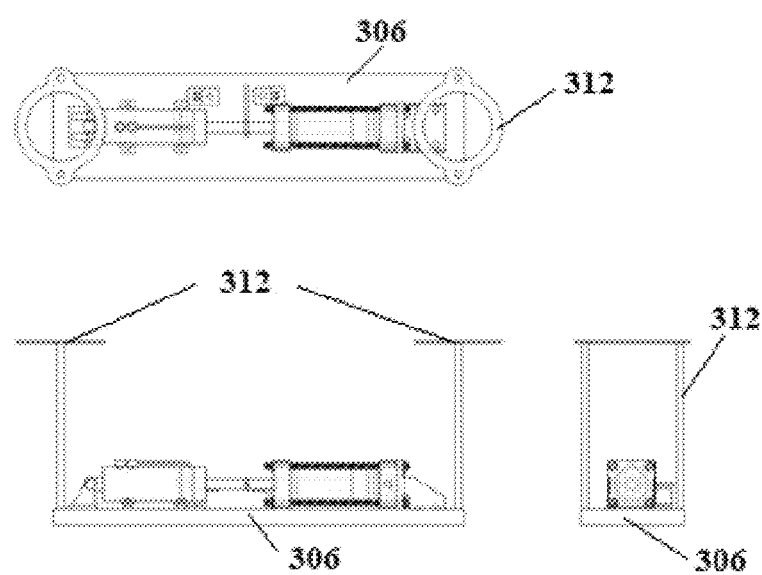

In accordance with a preferable embodiment of the present invention and as illustrated in FIG. 3 (a), the mechanical pressure converter includes two cylinders—the saltwater cylinder 300 and the hydraulic cylinder 302 which are connected by a rod 304 along with two pistons 310. The hydraulic cylinder 302 is designed for hydraulic oil and is a double acting cylinder with two ports to control the movement of the pistons 310 and the rod 304. The saltwater cylinder 300 is made of stainless steel (SS316) in order to resist the salinity of saltwater, and further comprises two saltwater caps 308, which are also made of the stainless steel (SS316)—that accommodate on top of the saltwater cylinder 300. The hydraulic cylinder is part of the pressure converting system that is responsible for converting the pressure from the oil side to the saline water side without direct contact. It is named hydraulic oil cylinder because it holds the high pressure oil that is pressurized by the oil hydraulic pump.

The mechanical system in accordance with the present invention generates mechanical energy (e.g., from wind) and the hydraulic pump that contains oil generates high pressure at the oil side using this mechanical energy. Subsequently, the mechanical pressure converter converts the pressure from the oil side to the saline water side without mixing or direct contact. Accordingly, the proposed system comprises mainly a mechanical energy source, an oil hydraulic pump and a mechanical pressure converter which consists of two cylinders with pistons i.e. the hydraulic oil cylinder 302 and saline water cylinder 300. The resulting high pressure saline water then is delivered to an RO membrane system to produce fresh water. In an embodiment, the mechanical system generates mechanical energy (from wind) that is used to power the oil hydraulic pump.

In accordance with the present invention and as illustrated in FIG. 3 (b), several additional components employed for designing the mechanical pressure converter include four hydraulic O-rings 318 which are attached around inner parts of the saltwater cylinder 300 and the hydraulic oil cylinder 302. Furthermore, two hydraulic seals 314 with specific grooves are inserted within the saltwater cylinder 300, close to the saltwater piston 310 in order to separate fluid from the saltwater cylinder 300 and the hydraulic cylinder 302. The saltwater caps 308 and the saltwater cylinder 300 are well-tightened using rods and bolts, and all main components of the present system are assembled on a metal base 306 wherein both the cylinders (300 and 302) are well supported.

Accordingly, FIG. 3(a) is an isometric view of the mechanical pressure converter highlighting the main components comprising the pressure converter, and FIG. 3(b) further highlights the mechanical pressure converter giving an insight in to the inner parts of the whole system. FIG. 3(c) highlights the components and displays the same from a top view, front view and side view of the mechanical pressure converter. In addition to the above, all the main components mentioned above are assembled on a metal base 306, supporting the saltwater cylinder 300 and the hydraulic cylinder 302 within a metal frame 312 securely.

In accordance with another embodiment of present invention, the proposed mechanical pressure converter system is connected to a mechanical system coupled with a commercial hydraulic pump. This mechanical system provides the required mechanical energy, such as wind or wave energy required to generate high pressure from the hydraulic pump. This generated high pressure is then conveyed to the saline water area through the mechanical pressure converter. Subsequently, the high-pressure saline water is fed to a reverse osmosis system in order to produce fresh water. The proposed system has been fabricated and tested and successfully converts mechanical energy to high pressure which is required to produce fresh water from saline water.

Figure 4:
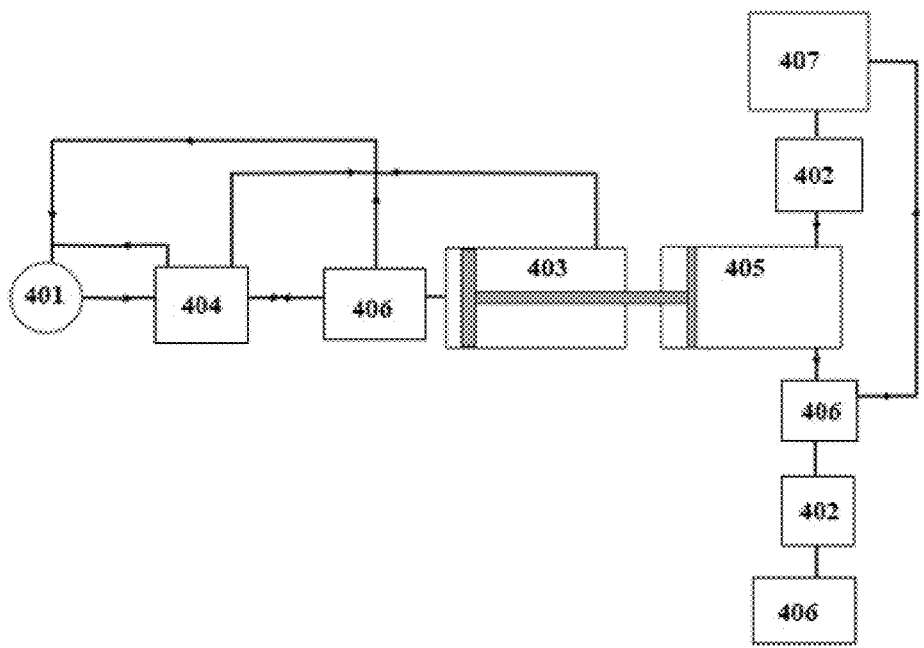
FIG. 4 illustrates a hydraulic circuit with valves and friction percent loss, in accordance with the present invention.
Figure 5:
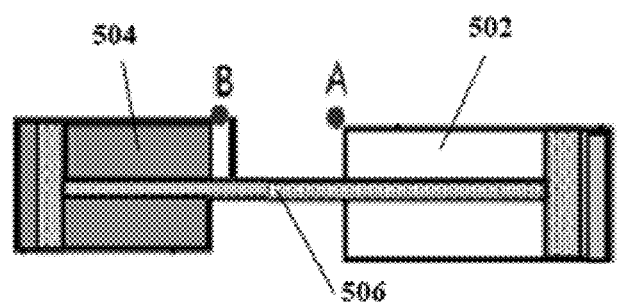
FIG. 5 illustrates the position of limit switches within the electrical circuit design in accordance with the present invention.

In accordance with a preferable embodiment of present invention, and as illustrated in FIG. 4 the proposed system further comprises a hydraulic circuit with a plurality of valves. This circuit comprises a pump 401, a hydraulic cylinder 403 and a saltwater cylinder 405. The saltwater cylinder 405 is connected to a saltwater reservoir 407 through a check valve 402. Relief valves 406 acting as safety valves are positioned near to the cylinders in order to control a pressure build-up within the mechanical pressure converter. A relief valve 406 is utilized or positioned before any other valve to ensure no unwanted pressure build-ups in the system in case a check valve 402 breaks and fails to open on time. It is observed that all components of the hydraulic circuit contribute a 5% friction loss to the system whereas a 4-way valve 404 contributes a 10% friction loss to the system.

In an embodiment of the present invention, an electrical circuit is utilized in the proposed system for the solenoid valve 404 to switch between different flow directions, without which the solenoid valve 404 would not be able to function considering that the point wherein the piston reaches an end of a cylinder (and that a stroke has finished) would be unknown. Accordingly arises a need for an electrical circuit comprising a first limit switch (denoted as A) positioned on the saltwater cylinder 502 and a second limit switch (denoted as B) positioned on the hydraulic oil cylinder 504, as denoted in FIGS. Functionally, when a clamp on the piston 506 touches either limit switch A or B, this indicates that the piston 506 has reached either the end or start of the saltwater cylinder 502 or the hydraulic oil cylinder 504. This in turn triggers the solenoid valve to switch flow directions. The solenoid valve is located at the bottom of a desk (physically), right before the two cylinders.

In an embodiment, when the piston 506 is retracting, oil enters through the lower part of the hydraulic oil cylinder 504 and leaves or exits from the upper part of the hydraulic oil cylinder 504. As a result, a suction force is formed in the seawater or saltwater cylinder 502 which sucks in seawater (or saline water) and fills up the saltwater cylinder 502. Subsequently, when the piston 506 reaches the start of the hydraulic oil cylinder 504 and the limit switch B is pressed, this then switches a direction of the flow of the hydraulic oil in the hydraulic oil cylinder 504. Oil now enters the upper part of the hydraulic oil cylinder 504 which then pushes the piston 506 and the seawater out of the saltwater cylinder 502—towards the semi-permeable membrane. A full capacity of the saltwater cylinder 502 depends on its volume and thus the limit to how much saltwater may be stored within the saltwater cylinder depends on the saltwater cylinder volume.

Figure 6:
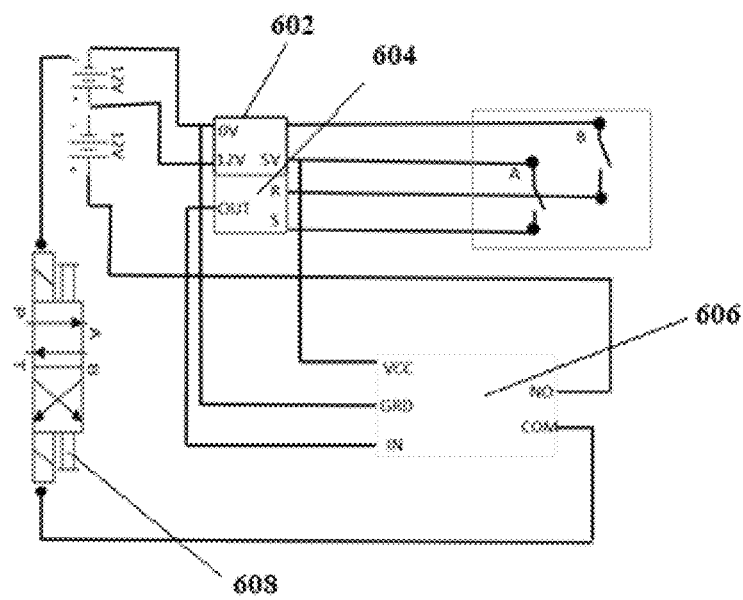
FIG. 6 illustrates the electrical circuit to switch between the different flow directions in the first and second cylinder, in accordance with the present invention.

In accordance with a preferable embodiment of present invention, and as depicted in FIG. 6, the electrical circuit comprises a voltage regulator 602, a reset/set (RS) flip-flop 604, first and second limit switches A and B and a relay 606. The voltage regulator 602 converts voltage between 12 V to 5 V wherein the 12 V are supplied from a battery, and may also be supplied from a wind turbine or small solar cell. In an embodiment, two 12 V batteries are connected in series for the solenoid valve, and one battery for the voltage regulator 602. The produced 5 V are used for the limit switches A and B and in order to power the relay 606. Without the use of the voltage regulator, the limit switches may receive a voltage much higher than their voltage rating and thereby overheat. The importance of the RS flip-flop 604 lies in the fact that it is responsible for switching between two states (on and off). When a pulse coming from switch A triggers the set (S) function, the RS flip-flop 604 remains on even if the switch is no longer pressed. Further, the RS flip-flop 604 remains on until a pulse coming from switch B triggers the reset (R) function and thereby resets and will turn off.

Figure 7:
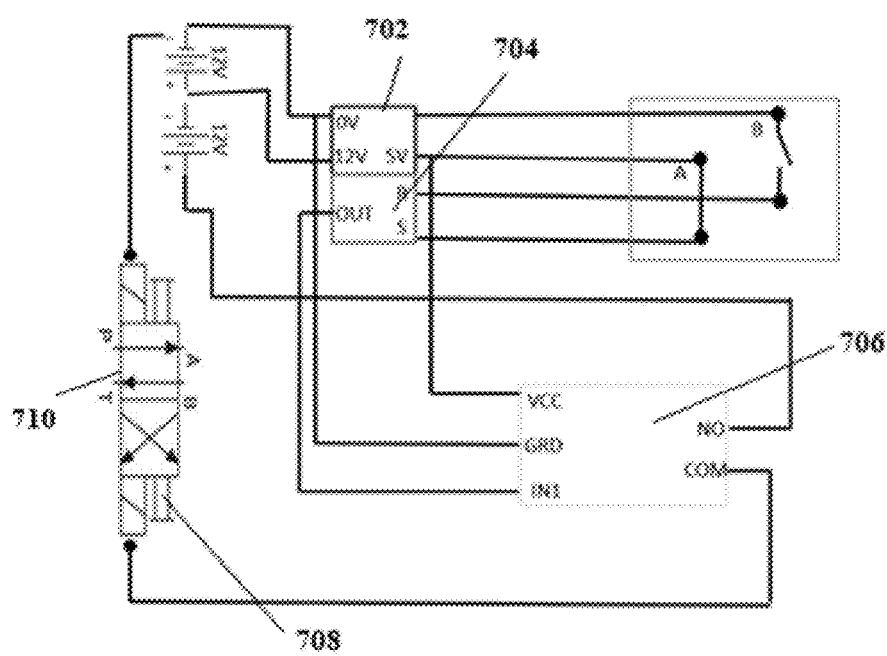
FIG. 7(a) illustrates the electrical circuit when a first limit switch is pressed, in accordance with the present invention.
FIG. 7(b) displays the relays when a second limit switch is pressed in accordance with the present invention.
Figure 7:
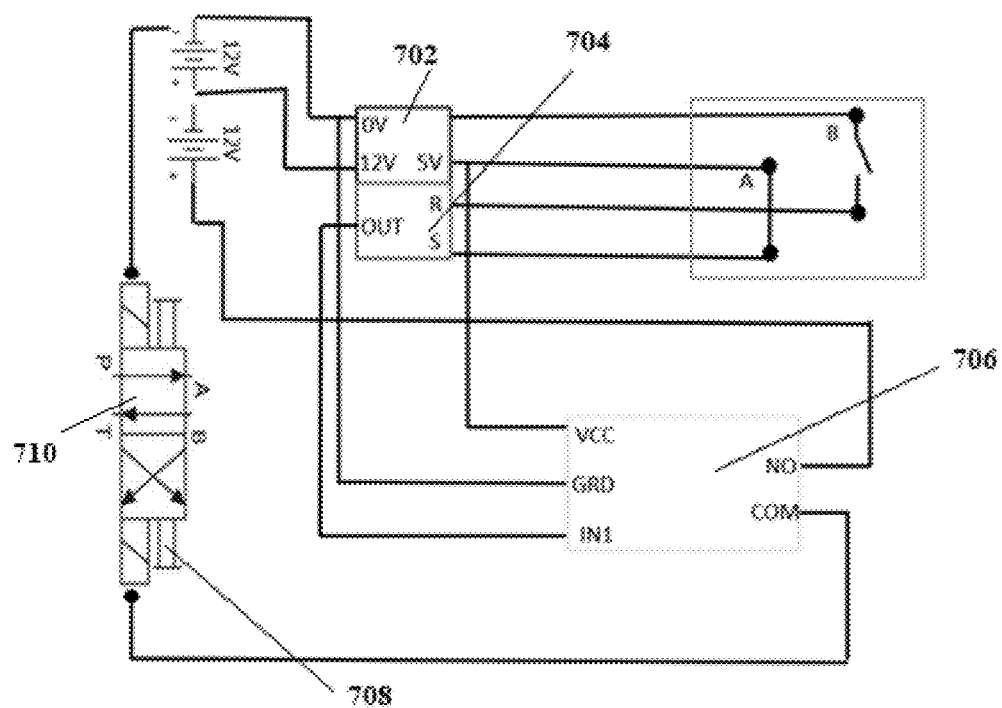

The relay 604 is a normally closed switch, which will remain closed if the input signal is low and wherein the input (IN) comes from the RS flip-flop 604. As shown in FIG. 6, a small clamp is attached to the piston rod 608 which moves along with the piston. When the piston 608 extends, the clamp hits limit switch A and the circuit is as shown in FIG. 7 (a). In this setting, the RS flip-flop 704 is set (S) and sends a signal with high voltage which will activate the coil and connect NO (normally open) with COM (common). A high voltage is sent to the solenoid valve 710 that will switch the direction of the retracting piston 708, and the solenoid valve 710 will connect P with B and T with A.

Figure 8:
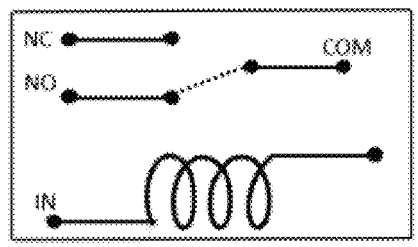
FIG. 8(a) illustrates the circuit when the first limit switch is pressed in accordance with the present invention.
FIG. 8(b) illustrates the circuit when the second limit switch is pressed in accordance with the present invention.
Figure 8:
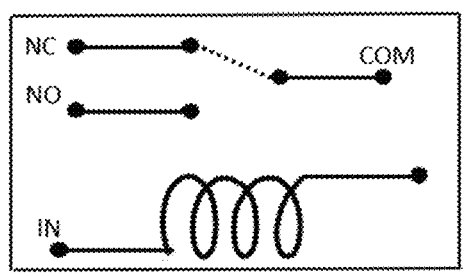

In accordance with a preferable embodiment of present invention, when switch B is pressed the circuit will be as shown in FIG. 7 (b). The RS flip-flop 704 is reset (R) and sends a signal with a low voltage. The coil will have no energy, which will connect NC (normally closed) to COM (common). This results in not sending a voltage to the solenoid valve 710, which will return it to its original state. The solenoid valve 710 will consequently connect P with A, and T with A and the piston 708 will be extending. FIGS. 8 (a) and (b) electrically denote NO (normally open) being connected with COM (common) when limit switch A is pressed, and NC (normally closed) being connected to COM (common) when limit switch B is pressed—respectively.

In accordance with a preferable embodiment of present invention, the present invention includes a ducted windmill capable of harvesting energy from very slow wind (about 2.5~3 m/s mean speed) as a source of mechanical energy. Also disclosed is a novel hydraulic system for converting mechanical energy to pressure. A process is further developed to couple membrane desalination to wind energy and a hydraulic energy convertor.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A pressure converter system for sustainably forcing saline water through a semi-permeable membrane, the pressure converter system comprising:
   a hydraulic oil pump;
   a hydraulic oil cylinder comprising pressurized oil generated from the hydraulic oil pump;
   a sustainable energy source for powering the hydraulic oil pump;
   a saline water cylinder containing saline water;
      wherein the hydraulic oil cylinder and the saline water cylinder are connected using a piston; and
   an electrical circuit for determining a direction of movement of the piston, wherein the electrical circuit comprises:
      a voltage regulator;
      an RS flip-flop; and
      a relay.

2. The pressure converter system of claim 1, wherein the electrical circuit comprises:
   a first limit switch;
   a second limit switch; and
   a solenoid valve;
      wherein the solenoid valve is triggered to switch a direction of movement of the piston, when the piston comes in contact with the first or second limit switch.

3. The pressure converter system of claim 2, wherein the first and second limit switches are positioned at a first end of the hydraulic oil cylinder and a second end of the saline water cylinder.

4. The pressure converter of claim 1, wherein the voltage regulator controls a power provided to the first and second limit switches ensuring that the first and second limit switches do not overheat.

5. The pressure converter system of claim 1, wherein pressure from the pressurized oil is transmitted to the saline water contained within the saline water cylinder, resulting in pressurized saline water.

6. The pressure converter system in accordance of claim 1, wherein the system is used for transforming saline water into fresh water sustainably.

7. The pressure converter system of claim 1, wherein the sustainable energy source is a ducted windmill.

8. The pressure converter system of claim 1, wherein the system further comprises a plurality of relief valves to control an increase or decrease in pressure within the hydraulic oil cylinder and the saline water cylinder.

9. The pressure converter system of claim 1, wherein the hydraulic oil cylinder is a double acting cylinder.

10. The pressure converter system of claim 2, wherein the solenoid valve is a four-way valve.

11. The pressure converter system of claim 1, wherein the saline water cylinder is made of stainless steel for resisting salinity of the saline water being stored.

12. The pressure converter system of claim 1, wherein a plurality of hydraulic O-rings are positioned within the hydraulic oil cylinder and saline water cylinder.

13. The pressure converter system of claim 1, wherein a plurality of hydraulic seals are positioned within the saline water cylinder to separate fluids from the hydraulic oil cylinder and saline water cylinder.

14. The pressure converter system of claim 1, wherein the saline water cylinder is connected with a saline water reservoir.

15. The pressure converter system of claim 1, wherein the piston is extendable and retractable.

16. A method of sustainably pressurizing seawater for penetrating through a semi-permeable membrane for desalination, the method comprising the steps of:

retracting a piston from a first position to a second position owing to which oil flows through a hydraulic oil cylinder;
   wherein retraction of the piston creates a suction force within a seawater cylinder, thereby filling the seawater cylinder with seawater;
switching a direction of movement of the piston when the piston comes in contact with a limit switch;
pushing the seawater contained within the seawater cylinder towards the semi-permeable membrane; and
determining a direction of movement of the piston using an electrical circuit, the electrical circuit further comprising a voltage regulator, an RS flip-flop and a relay;
   wherein the seawater being pushed out of the seawater cylinder is pressurized and capable of penetrating through the semi-permeable membrane.

17. The method of claim 16, wherein a solenoid valve is used for switching the direction of movement of the piston when in contact with the limit switch.

18. The method of claim 16, wherein movement of the piston is automatic.

19. The method of claim 16, wherein the piston is extendable and retractable.

\* \* \* \* \*